March 28, 1944.　　　S. W. FARBER　　　2,345,248
MOUNTING FERRULE AND HANDLE FOR UTENSILS
Filed April 27, 1940　　　2 Sheets-Sheet 1
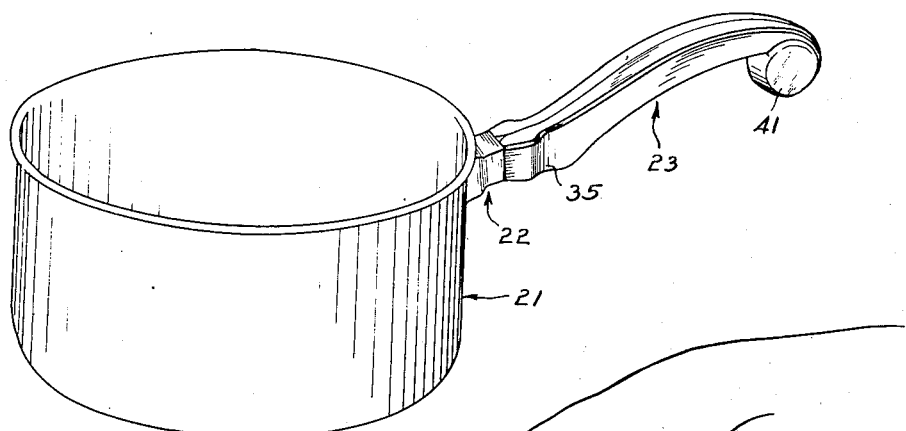
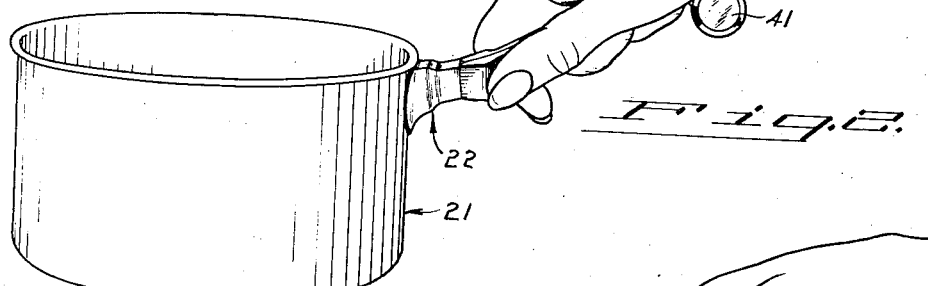
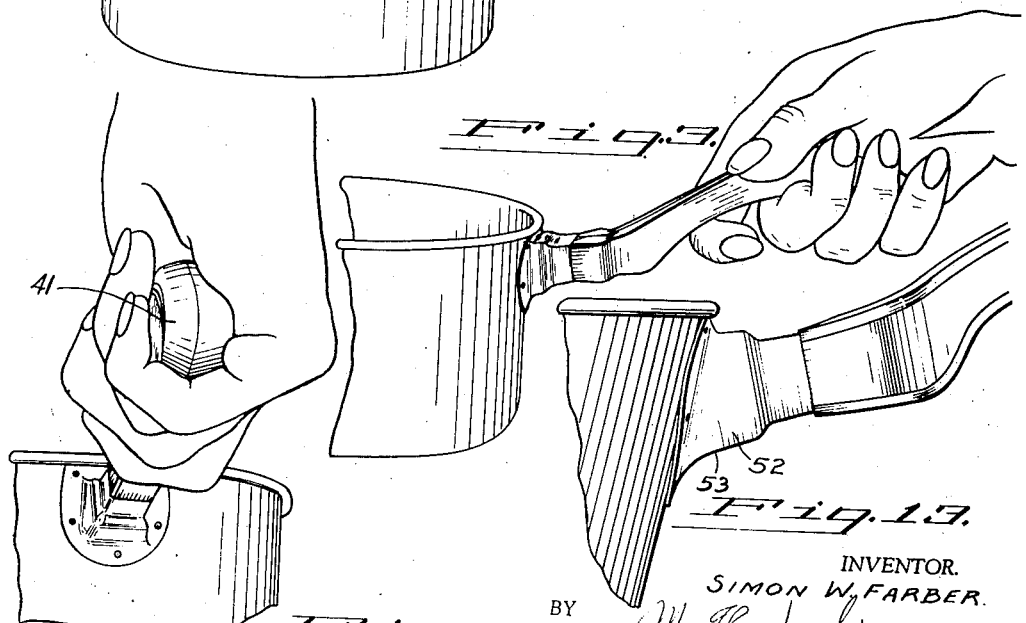
INVENTOR.
SIMON W. FARBER.
BY
ATTORNEY.

March 28, 1944. S. W. FARBER 2,345,248
MOUNTING FERRULE AND HANDLE FOR UTENSILS
Filed April 27, 1940 2 Sheets-Sheet 2
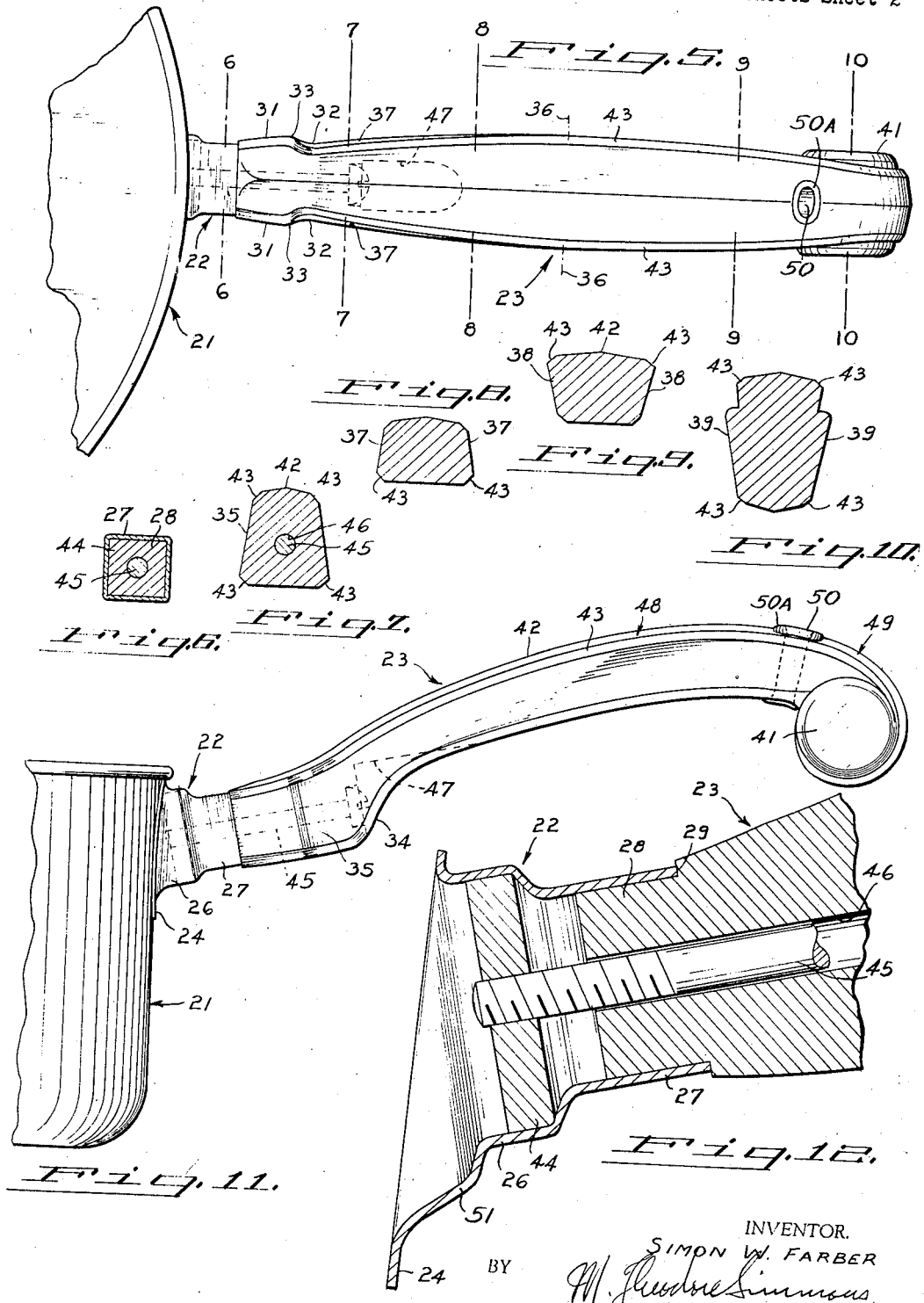
INVENTOR.
SIMON W. FARBER
BY
ATTORNEY.

Patented Mar. 28, 1944

2,345,248

UNITED STATES PATENT OFFICE 2,345,248

MOUNTING FERRULE AND HANDLE FOR UTENSILS

Simon W. Farber, Brooklyn, N. Y.

Application April 27, 1940, Serial No. 331,929

4 Claims. (Cl. 16—114)

My invention relates to a mounting ferrule and handle for utensils, and more particularly to a design and construction thereof for use upon cooking utensils, such as saucepans, frying pans, etc.

Heretofore, a considerable part of the manufacturing cost of certain cooking utensils has been due to the provision of a somewhat complicated multiple-part mounting ferrule for the handle, while a great deal of the dissatisfaction with some utensils has been due to the failure to design the handle to conform to the grip of the hand. Where attempts have been made to combine the ferrule and mounting, the device has been cumbersome and inefficient, especially in the cooperation between the ferrule and handle. Accordingly, such utensils have not been convenient and thoroughly practical to handle in use.

My invention provides a properly designed and constructed handle, and a simple combined mounting and ferrule for the handle, whereby the utensil is always convenient and comfortable to move from place to place in its use, the utensil is automatically carried with the top thereof level when the handle is gripped in any of the usual or normal manners, the weight of the filled utensil is properly and evenly distributed so that a minimum of effort will be required to lift and carry the utensil, there is less danger or likelihood of the handle being improperly or incompletely gripped so that the contents of the utensil would be spilled or the utensil dropped or the hand burned, the handle cannot be turned in its mounting so that it will always be in useful position, the weight of the utensil and its contents are distributed between the handle and the ferrule so that very little and practically none of the weight is transmitted to or carried by the bolt which holds the handle in place, the handle and mounting ferrule are each simple, one-piece constructions which are easy and economical to manufacture, as well as to mount and assemble together so that the ultimate manufacturing cost of the utensil is reduced materially, and the appeal of the utensil to the eye of the customer is enhanced.

Others have, in many cases, had those same objects in view, but they have not attained the results or the simplicity of my improved construction or design. Briefly stated, my improved mounting ferrule is one piece of metal, preferably drawn from a sheet of stainless steel, but may be a casting, and may be made of other materials. The ferrule is provided with a base flange arranged to be welded or otherwise secured to the utensil, a pocket for the reception of a large nut which is part of the bolt for the assembly of the handle, and which also does useful work in connection with the wider distribution of the weight and related forces, and a sleeve for the reception of the handle. The pocket and the cooperating nut, as well as the sleeve, are square in shape, which prevents possibility of the handle or the nut turning, and by one or more drawing operations, the sleeve and pocket are arranged so that the handle is mounted at a considerable angle with respect to the horizontal. Furthermore, the sleeve is of substantial depth and area to cooperate with a mating portion of the handle and the handle and mounting ferrule will usefully support the weight of the utensil without any mounting screw or other fastening means. Thus, this construction may be used also for a detachable lifting handle where one lifting handle is used for a plurality of utensils.

My improved handle also includes a body having a tapered top, and flat bottom and side surfaces, the body being wider than it is thick, and widest at its center. Inwardly from this wide portion, toward the utensil, the sides of the handle are tapered or flared outwardly from the top to the bottom, while from the wide center rearwardly, the sides of the handle are tapered inwardly from the top of the bottom. Near the inner end the handle is provided with an enlarged finger and thumb guard. When the handle is mounted in place, it has a continuous, gradual upward curve from the guard almost to the rear end thereof, and then the handle curves downwardly sharply, terminating at the rear end in an enlarged and depending head or knob, the inward taper of the sides of which is more pronounced than the taper in the body of the handle.

These and other features and objects of my invention will be understood more fully as this description proceeds, and when taken in conjunction with the accompanying drawings, wherein, as illustrative of one application of the invention—

Figure 1 is a perspective view of a cooking pot provided with my improved handle and mounting ferrule.

Figs. 2, 3 and 4 are perspective views, each from a different angle, illustrating how different styles of hand grip fit naturally about my improved handle.

Fig. 5 is a plan view of the handle and pot, the latter being broken away to a considerable extent.

Fig. 6 to Fig. 10 inclusive are cross sections through the handle taken respectively on the line 6—6, 7—7, 8—8, 9—9, 10—10, all of Fig. 5.

Fig. 11 is an elevational view of the handle and pot, parts being broken away.

Fig. 12 is an enlarged fragmentary sectional view showing a modified construction of mounting ferrule and also illustrating the relationship of the parts which is common to all forms illustrated.

Fig. 13 is a fragmentary elevational view of a further modified form of mounting ferrule.

Referring to the drawings, and more particularly to Figs. 5 to 12, inclusive, the utensil is indicated at 21, the ferrule at 22, and the handle at 23. The ferrule is preferably drawn from a sheet of metal and comprises a peripheral base flange 24 (seen also in elevation in Fig. 4) from which projects a pocket 26, and a sleeve 27 which is of slightly smaller size than the pocket, and both of which are square in shape. The pocket is of irregular depth to enable the flange to lay flat against, as well as to accommodate itself to, the slope of the side wall of the utensil, and at the same time to have the axis of the ferrule at a considerable angle with respect to the horizontal, here shown as an angle of approximately 15°. The flange is wide enough so that the ferrule can be spot welded or otherwise properly secured to the utensil.

The sleeve 27 is also of substantial length (Figs. 6 and 12), and the square shank 28 of the handle 23 closely fits the sleeve and extends the full length thereof. The end of the sleeve 27 rests against the shoulder 29 between the shank and the body of the handle. The sides of the handle taper outwardly from the shoulder 29, as indicated at 31, and then taper off suddenly to the reduced neck 32, leaving slightly protruding ridges 33. A short distance beyond the ridges 33 the thickness of the handle from top to bottom is decreased, leaving a shoulder 34 which extends across the underside of the handle. This shoulder, together with the portion 31 and the neck 32, form a guard to keep the fingers and thumb of the user's hand away from the metal of the ferrule, and hence from being burned. The slightly protruding ridges 33 and the shoulder 34 serve to somewhat automatically arrest the hand from moving too far forward, while the flat portion 35 immediately in front of the shoulder 34 (Figs. 7 and 11) serves as a rest for the thumb and forefinger. The sides of the body of the handle are bowed outwardly from the neck 32 to the outer end thereof, the maximum width occurring at the median line 36. Also, the handle is arched upwardly from the reduced neck 33 and curves downwardly at the rear of the handle.

From the ridges 33 to approximately the median line 36 the sides of the handle are tapered outwardly as indicated at 37 in Fig. 5, and seen also in Figs. 7 and 8. Thus, in this portion, the handle is narrower at the top than at the bottom thereof. From the median line 36 to the outer end of the handle, the same is tapered in the opposite direction, that is to say, with the widest portion at the top, this taper being seen at 38 in Fig. 9 and at 39 in Fig. 10.

At its outer end, the handle is provided with an enlarged knob 41 which is wider than the body of the handle at this point, and also depends a considerable distance therebelow (Fig. 11). It will be noted that the knob 41 is confined within the projection of the arched curve of the handle, and a projection of the angle of the axis of the sleeve 27 of the ferrule and of the shank 28 of the handle will extend adjacent the knob 41, leaving the thinner arched portion of the handle entirely above that axis. Since the sides of the knob are tapered as shown at 39, which angle is desirably greater than the angle 38, the knob is narrow across its bottom edge, for purposes to be hereinafter referred to.

The top of the handle is provided with a center ridge 42, and the longitudinal top and bottom edges of the handle are beveled, as shown at 43. From the ridge 42 to the top beveled side edges the top of the handle has a flat taper providing a thumb rest for certain hand grips tending to cause naturally a pressure toward the forefinger. As seen in Fig. 4, ridge 42 continues around the knob 41.

As stated above, the shank 28 of the handle, and the sleeve 27 of the ferrule are preferably sufficiently long and interfit snugly enough that the weight of the utensil and its contents could be carried when the handle is inserted in the ferrule. However, in cases where the handle is to be permanently attached to the utensil, which is the preferred arrangement according to the present disclosure, the nut 44 is fitted into the pocket 26 of the ferrule, with which a bolt 45 engages, the bolt passing through an aperture 46 which extends through the handle from the shoulder 34, the handle being cut away, as shown at 47, to permit easy access to the screw head. The nut 44 is desirably of a size to fit the side walls of the pocket 26 and may have a press fit therein. Accordingly, the pressure due to any of the weight of the utensil which might be taken up by the bolt 45 is distributed over the large areas of the interfitting faces of the nut 44 and pocket 26 of the ferrule, so that as a practical matter, there is substantially no sheering force on the bolt itself, and the bolt serves primarily the purpose of holding the parts in assembled relation. As will be seen from Fig. 12, the space between the saucepan 21 and the end of the handle is entirely blocked by the nut 44, which arrangement assists in keeping the handle cool.

Figs. 2 to 4 illustrate the use of the handle and ferrule on a utensil. Fig. 2 illustrates the overhand grip, where the palm of the hand is across the top of the handle, in which position the thumb extends along the side of the handle, resting on the flattened surface 35 (Fig. 11), and the fingers extend principally under the arched portion of the handle, with the forefinger resting on the surface 35 on the opposite side of the handle, and the little finger inside of the knob 41. The outwardly flared taper of the handle between the thumb and forefinger fits their normal position to exert naturally a slight pressure therebetween as part of the grip, and at the same time there is no tendency of the thumb to slip off the handle or to produce an unnatural squeezing. The handle is desirably of sufficient length that the downwardly curved rear portion of the arch, indicated at 49 in Fig. 11, rests under the heel of the hand without any bulging and without producing any tendency to press down on the outer end of the handle, which would thereby tip the utensil. Also, the upwardly curved portion 48 of the handle fits well into the palm of the hand so as to give the feeling of solidarity in the grip.

Fig. 3 illustrates the grip of the hand on the end of the handle where the knob 41 is between the palm of the hand and the second and third fingers, while the forefinger extends under the handle, and the thumb rests along the upper tapered surface or beveled edge. In this position, the downwardly tapered rear portion 49 of the handle, including the knob, fits naturally between the fingers and palm and comfortably fills the space, while the curved portion 49 fits snugly in the hand and the wide portion of the handle presents a broad surface under which the forefinger extends in a normal position, so that again there is the feeling of solidness and the absence of any element which would tend to cause the user to tilt the utensil at an angle, either forward or backward, or to either side.

Fig. 4 illustrates a modification of the grip shown in Fig. 3, and also illustrates the fitting of the knob 41 in the hand. In this case, the hand is sufficiently far forward on the handle, that the knob 41 is between the little finger and the heel of the hand. It will be noted that the tapered sides of the knob 41 fit the angles naturally formed between the little finger and the heel of the hand when it is partially closed, as it is in the grip, while presenting large flat side surfaces. Again, the curved portion 49 fits comfortably in the palm of the hand, while the forefinger rests under the broad portion of the handle, or in the smaller sizes, forward of the widest portion of the handle, so that there is nothing to induce any tendency to lift the utensil at an angle. In all positions of the grip, the weight is well distributed in the handle, and the handle fits in the hand so that the weight is in turn distributed throughout the whole grip.

When the utensil is not in use, the same may be hung up or suspended from a hook, a transverse hole 50 being provided for this purpose. The hole may be defined by an eyelet, or in the case of plastic handles for example, the edges of the hole may be protected by a raised rim such as indicated at 50A.

Figs. 12 and 13 illustrate modifications of the mounting ferrule adapting the same to use upon utensils having sloping sides. In these figures like reference characters refer to corresponding parts in the other figures. In Fig. 12, an intermediate step 51 is interposed between the flange 24 and the pocket 26, the step being deeper along the bottom edge of the ferrule and of a depth to accommodate the same to the slope of the side wall of the utensil to which it is attached. In Fig. 13, the pocket 26 is replaced by the pocket 52. This pocket has a long bottom wall 53, so that the pocket is of increasing depth from top to bottom so that the ferrule again may accommodate itself to a sloping side wall utensil.

The showing of a square shaped sleeve 27 and interfitting square shaped shank 28 is illustrative of other complementary shaped interfitting parts which will accomplish the desired purposes, such as other angular shapes or elliptical or other shapes. The same is true of the square shaped nut and cooperating pocket in which the assembly in fixed position of the nut is accomplished without welding, or soldering, or the like, and the nut remains in place when replacement of handle may be desired.

I wish it to be understood that I do not desire to be limited to the exact details of construction shown and described, for obvious modifications will occur to a person skilled in the art.

I claim:

1. In means attached to a utensil for lifting and carrying the same, a combined ferrule and handle mount having a base flange secured to the utensil, a pocket, an angle producing spacing step between the pocket and flange, and a sleeve of considerable length, a handle having a shank interfitting with the sleeve for a major portion of its length, an enlarged finger guard adjacent the shank, a reduced flattened neck portion, a body extending outwardly from said neck, the sides of the body being bowed outwardly and the body being arched upwardly on both its top and bottom and having flat sides and top and bottom, and an enlarged depending knob at the outer end of the arched body and extending below the same, the sides of the inner portion of the body being tapered outwardly and of the outer portion of the body and the knob being tapered inwardly from top to bottom, a nut fitting in the pocket of the ferrule, and a bolt extending through the shank only of the handle and secured in said nut.

2. In means attached to a utensil for lifting and carrying the same, means for mounting a handle on the utensil and including a sleeve, a handle having a shank mounted in the sleeve, a finger guard adjacent the shank, a flat finger rest, and an arched body of less thickness than the shank, both the top and bottom of the body being arched upwardly, the sides of the body adjacent the finger rest being tapered downwardly and outwardly and that adjacent the outer end of the handle being tapered downwardly and inwardly from top to bottom.

3. In means attached to a utensil for lifting and carrying the same, means for mounting a handle on the utensil and including a sleeve, and a handle having a shank mounted in the sleeve, an enlarged finger guard adjacent the shank, a reduced flattened neck portion in back of the finger guard, an arched body extending outwardly and upwardly from said neck, the body having flat side, top and bottom surfaces, the sides of the body being tapered from top to bottom, the arch of the body terminating in an enlarged knob also having flat tapered sides, the knob depending beneath the handle.

4. A cooking utensil having a side wall and means for lifting and carrying the same comprising a ferrule having a wide base flange secured to said side wall, a substantially flat sided pocket, a sleeve extending outwardly from said pocket, and an intermediate spacing step arranged to dispose the axis of the pocket and sleeve at an acute angle to the horizontal; and a handle having a shank interfitting with said sleeve, a body arched upwardly and outwardly from said shank, substantially all of the arched portion extending above the level of the top of said utensil, the body terminating in an enlarged knob which depends therebelow but not below the level of the top of said utensil, the sides of the forward end of said body being tapered outwardly and downwardly and the sides of the outer end of said body and of said knob being tapered inwardly and downwardly; a nut interfitting with the flat sides of said pocket, and a bolt extending through the shank only of said handle and engaging said nut.

SIMON W. FARBER.